United States Patent [19]
Hofmann

[11] Patent Number: 4,964,668
[45] Date of Patent: Oct. 23, 1990

[54] TOP FOR VEHICLES, PARTICULARLY PASSENGER CARS

[75] Inventor: Franz Hofmann, Hausen/Würm, Fed. Rep. of Germany

[73] Assignee: Dr. Ing.h.c.F. Porsche AG, Fed. Rep. of Germany

[21] Appl. No.: 400,718

[22] Filed: Aug. 30, 1989

[30] Foreign Application Priority Data

Aug. 30, 1988 [DE] Fed. Rep. of Germany ....... 3829345

[51] Int. Cl.$^5$ ............................................. B60J 7/08
[52] U.S. Cl. ................................. 296/107; 296/116; 296/39.3
[58] Field of Search ............................... 296/107–117, 296/39.3

[56] References Cited

U.S. PATENT DOCUMENTS

| | | | |
|---|---|---|---|
| 2,040,680 | 5/1936 | Westrope | 296/107 |
| 2,833,593 | 5/1958 | Olivier et al. | 296/107 |
| 3,050,334 | 8/1962 | Geiger | 296/107 |
| 3,319,995 | 5/1967 | Bohn | 296/107 |

Primary Examiner—Robert R. Song
Attorney, Agent, or Firm—Evenson Wands Edwards Lenahan & McKeown

[57] ABSTRACT

For a top of a passenger car, a noise/thermal insulating intermediate layer and an interior ceiling are arranged inside an exterior top covering of the top for muffling noise and for achieving an effective thermal protection against heat and coldness. So that an inflating of the top covering is avoided during a driving operation at speed, the top covering, supporting layers of the intermediate layer and the interior ceiling are attached to a plurality of transversely extending bows of the top.

17 Claims, 3 Drawing Sheets

TOP FOR VEHICLES, PARTICULARLY PASSENGER CARS

BACKGROUND AND SUMMARY OF THE INVENTION

The present invention generally relates to a top for vehicles, particularly passenger cars.

U.S. Pat. No. 2,040,680 discloses an exterior top covering which rests against the exterior side of transversely extending bows without being fastened thereto and is tightened by the bows. This arrangement has the disadvantage that, when the top is closed during a driving operation, the top inflates in the shape of a balloon which is found to be annoying. In addition, in the case of an unlined top of this type, the noises occurring outside the vehicle are transmitted into the passenger space of the vehicle by way of the top covering almost at their full volume. Furthermore, a top of this type offers little protection from heat and cold.

Accordingly, it is an object of the present invention to provide a top that reduces the noise transmitted to a passenger space as a result of the operation of the vehicle and avoids an inflating effect when the top is closed as well as providing efficient thermal protection with respect to heat and cold.

According to preferred embodiments of the present invention, this object and other objects are achieved by providing the top with a sound/thermal insulating intermediate layer and an interior ceiling which are affixed to a plurality of transverely extending bows of a frame of the top.

Main advantages achieved by preferred embodiments of the present invention are that, by means of the arrangement of the interior ceiling and of the sound/thermal insulating intermediate layer, the noise in the passenger space is reduced considerably. Further, an inflating of the top covering is largely avoided by fastening the top covering, the ceiling and supporting layers of the intermediate layer at a pluarlity of transversely extending bows. Locally arranged, shaped air cushions located on the interior side of the top covering or under the intermediate layers, assure that the top has a round shape without any sink points.

Other objects, advantages and novel features of the present invention will become apparent from the following detailed description of the invention when considered in conjunction with the accompanying drawings

DETAILED DESCRIPTION OF THE DRAWINGS

Figure 1:
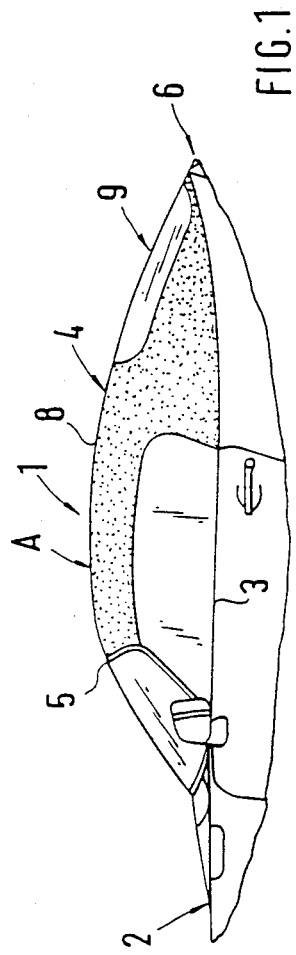
FIG. 1 is a partial lateral view of a passenger car having a top in accordance with one embodiment of the present invention.

An embodiment of the present invention is shown in the drawings and will be explained in detail in the following.

FIG. 1 shows a passenger car 1, a body 2 of which comprises a top 4 above a belt line 3, this top 4, in a closed position A, extending between a windshield frame 5 and a rear area 6. In the closed position A, the top 4 is held in position at the windshield frame 5 by means of fastening devices which are not shown in detail. After a release of the fastening devices, the top 4 can be folded back into a cargo space on the rear side which is not shown.

The top 4, which is preferably constructed as folding top, is composed of a top structure 7 and an exterior top covering 8, this top covering 8, adjacent to the rear area 6, being provided with a flexible or rigid window 9. According to FIG. 2, the top structure 7 comprises a front top frame 10, a rear top frame 11, a parallelogram linkage 12 engaging at the rear top frame 11 as well as bows 13, 14, 15, 16 extending transversely to the longitudinal direction of the vehicle. Bow 13 is Pivotally connected to the front top frame 10, whereas bow 14 is assigned to the rear top frame 11. The stationary bow 15 forms an upper part of a main top pillar 17, and the swivelling bow 16 is pivotally connected to the main top pillar 17 and extends above the window 9.

Figure 6:
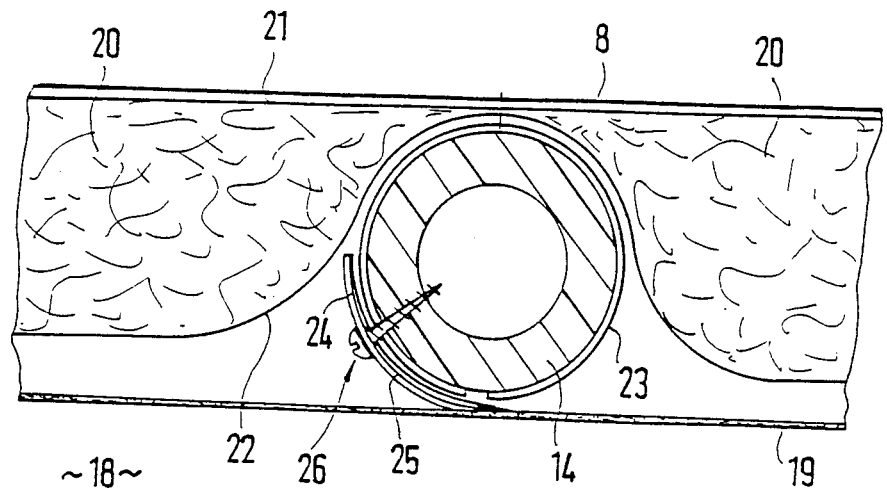
FIG. 6 is an enlarged sectional view according to Line VI—VI of FIG. 5.

According to FIG. 6, the top 4, on the side facing a passenger space 18, is provided with a ceiling 19 and a noise/thermal insulating intermediate layer 20 which is arranged between the ceiling 19 and the top covering 8. The intermediate layer 20, which is made of a nonwoven material consisting of polyester fiber, rubberized-hair fabric or the like, extends between an upper and a lower supporting layer 21 and 22 and is fastened, for example by gluing to both supporting layers 21, 22. The intermediate layer 20 has the effect of a equalization of temperatures; i.e., that it does not become too warm in the summer and too cool in the winter. In addition, by means of the intermediate layer 20, noises occurring outside the vehicle are transmitted into the passenger space 18 in an effectively muffled manner.

In order to avoid an inflating of the exterior top covering 8, the exterior top covering 8, the interior ceiling 19 and the two supporting layers 21, 22 of the intermediate layer 20 are fastened to a pluarlity of transversely extending bows 13, 14, 15, 16. The fastening takes place continuously, specifically over a significant part of the width of the bows 13, 14, 15, 16. It is only at the laterally exterior upright sections of the bows 13, 14, 15, 16 that the top covering 8 rests on them loosely on the outside. In the area of these bows, 13, 14, 15, 16, the intermediate layer 20 adapts itself to their shape and vanishes in the area of the fastening of the supporting layers 21, 22 and of the top covering 8. The exterior top covering 8, the two supporting layers 21, 22 which are placed locally against one another, and an interior holding strip 23 are sewn or welded together with one another above the bows 13, 14, 15, 16. The interior holding strip 23 is guided around the bow 13, 14, 15, 16 and is glued or screwed together with it.

Figure 7:
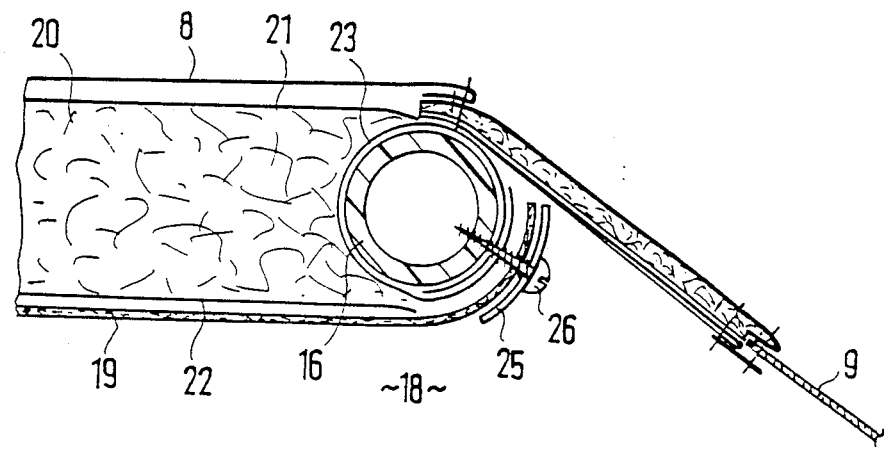
FIG. 7 is an enlarged sectional view according to Line VII—VII of FIG. 5.

Locally, tensioning strips 24 are sewn, glued or welded to the interior ceiling 19, these tensioning strips 24 being bent upwards to the bow 13, 14, 15, 16 and, by means of a saucer-type element 25 and a fastening screw 26 or a rivet, being fixed at the bow 13, 14, 15, 16. In cross-sectional view, the saucer-type elements 25 are bent approximately in the shape of a quarter circle. At the bow 16, which is farthest in the rear, the tension strip 24 is not required because the ceiling 19, in sections, is guided directly around the bow 16 and is fixed by means of a saucer-type element 25 and a fastening screw 26 (FIG. 7).

Figure 3:
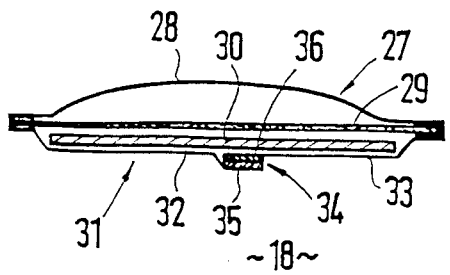
FIG. 3 is an enlarged sectional view according to Line III—III of FIG. 2.
Figure 4:
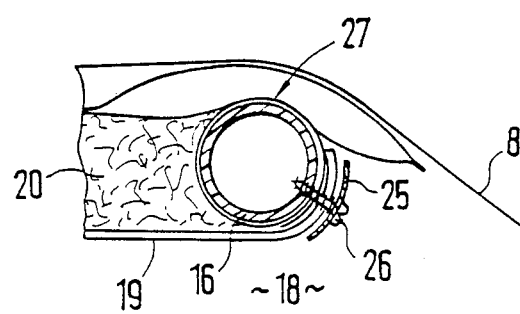
FIG. 4 is an enlarged sectional view according to Line IV—IV of FIG. 2.
Figure 5:
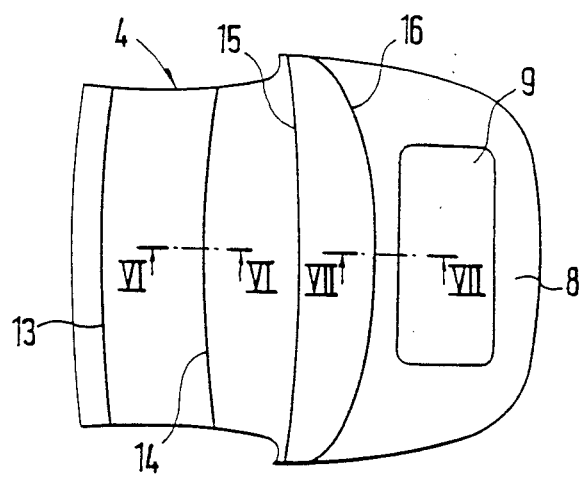
FIG. 5 is a plan view of the top according to FIG. 2.

In order to avoid sink points at the exterior top contour, shaped inflatable air cushions 27, as seen in FIG. 1, 3 and 4, are arranged at least in sections beneath the top covering 8, the air cushions being controlled, for example, pneumatically or electrically. For example, during the locking of the top 4 at the windshield frame 5, the air cushions 27 are inflated automatically and are evacuated again during the unlocking. However, it is also possible to inflate or evacuate the air cushions 27, which are connected with a pump by way of hoses, by means of an actuating switch. As a result of such an evacuation, the cargo space for housing the top 4 can have a lower overall height than if the air cushions 27 were inflated permanently.

Sink points at the top 4 occur mainly in the edge area of the rear-side window 9 so that the air cushions 27 are preferably arranged above and laterally of this window 9. According to FIG. 2, the air cushions 27 extend over the whole longitudinal and transverse course of the top 4. Each air cushion 27 consists of two parts 28, 29 which, on the edge side, are airtightly connected with one another (FIG. 3). The air cushions 27 are located directly under the exterior top covering 8 or under the intermediate layer 20. A narrow tightening belt 30, on which the air cushion 27 rests, extends under the air cushion 27.

Figure 2:
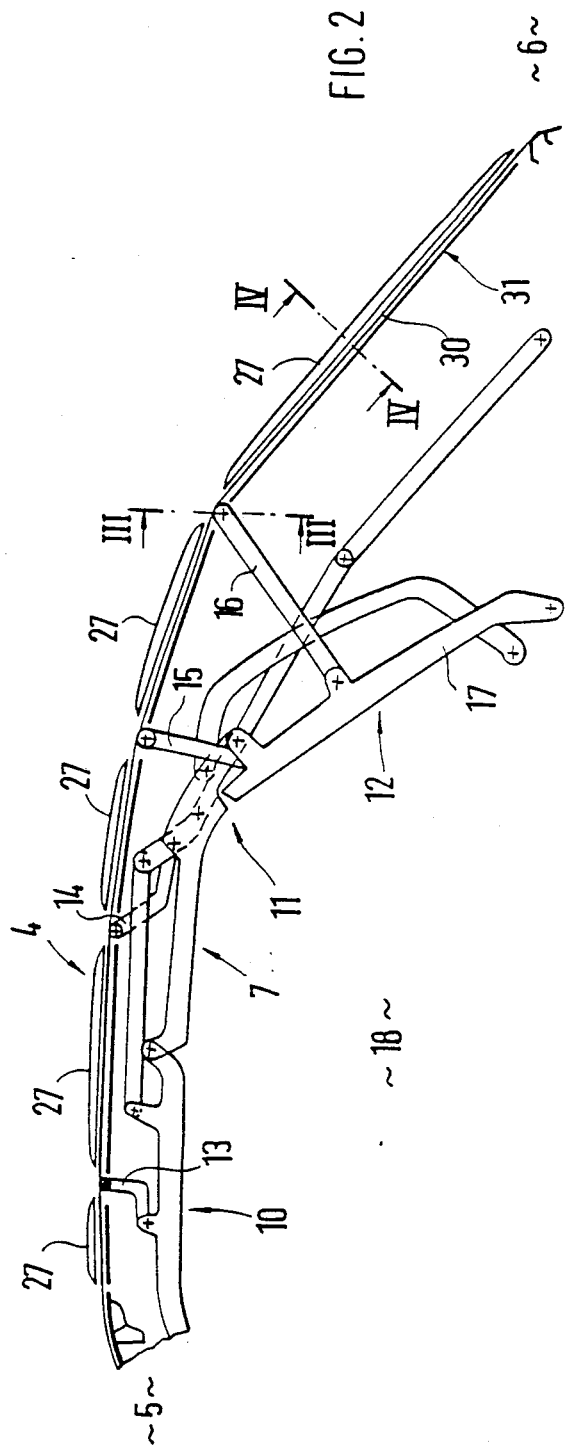
FIG. 2 is a partial lateral view of the top of FIG. 1 without the exterior top covering.

The tightening belt 30, according to FIG. 2, extends over the whole length of the top 4 and is fixedly connected with the individual bows 13, 14, 15, 16. For the fixing of the air cushion 27 in transverse direction, a two-part holding strap 31 is provided which is connected with the air cushion 27 and reaches under the tightening belt 30. The two parts 32, 33 of the holding strap 31 are connected with one another by means of a velcro-type closure so that an easy exchange of air cushions 27 is ensured. The velcro-type closure 34 consists of a fleece strip 35 and a gripping strip 36, the fleece strip 35 being mounted at one part (for example, 32) and the gripping strip 36 being arranged at the other part (for example, 33) of the holding strap 31. Instead of the velcro-type closure, a zipper-type closure or another fast-closing device may also be used.

In order to avoid sink points at the top 4, padding materials may also be used.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A top for a vehicle, particularly a passenger car, comprising an exterior top covering and a top linkage hinged to a body of the vehicle and having several bows extending transversely with respect to a longitudinal direction of the vehicle, wherein on a side of the exterior top covering which faces a passenger space, a noise/thermal insulating intermediate layer having top and bottom supporting layers, and an interior ceiling are arranged and wherein the exterior top covering, supporting layers of the noise/thermal insulating intermediate layer and the interior ceiling are fastened to a plurality of the several transversely extending bows.

2. A top according to claim 1, wherein the exterior top cover, supporting layers of the noise/thermal insulating intermediate layer, and the interior ceiling are fastened to all the several transverely extending bows.

3. A top according to claim 2, wherein the exterior top covering, the supporting layers and the ceiling are fastened to a significant part of a width of each of the several bows.

4. A top according to claim 2, wherein the supporting layers of the intermediate layer include an upper and a lower supporting layer which delimit the intermediate layer and wherein the intermediate layer is glued to the supporting layers.

5. A top according to claim 2, wherein the intermediate layer, in an area at the fastening of the top covering and the supporting layers to each of the several bows, adapts itself to a shape of an associated bow and vanishes.

6. A top according to claim 2, wherein the top covering, the supporting layers and a holding strip means are at least one of sewn and welded together with one another above each of the several bows.

7. A top covering according to claim 6, wherein the holding strip means substantially surrounds an associated bow and is connected with the associated bow by means of at least one of screwing and gluing.

8. A top covering according to claim 6, wherein tightening strips means are at least one of sewn, glued and welded to the interior ceiling at an area of each of the several bows, the tightening strips means resting against an exterior side of the holding strips means and being fixed to an associated bow by means of a saucer-type element and at least one of a fastening screw means and a rivet means.

9. A top according to claim 2, wherein at least locally shaped inflatable air cushion means are arranged inside the top covering.

10. A top according to claim 9, wherein inflation of the air cushion means is controlled pneumatically.

11. A top according to claim 9, wherein inflation of the air cushion means is controlled electrically.

12. A top according to claim 9, wherein the air cushion means are inflated automatically when the top is locked to the windshield frame, and are evacuated when the top is unlocked.

13. A top according to claim 9, wherein the top includes a rear-side window and air cushion means are arranged above and laterally of the rear-side window of the top.

14. A top according to claim 9, wherein the air cushion means comprises two parts which, on an edge side, are airtightly connected with one another.

15. A top according to claim 9, wherein under the air cushion means, at least one tensioning belt means is provided on which the air cushion means rests and wherein the tensioning belt means is surrounded by a holding strap means connected to the air cushion means.

16. A top according to claim 15, wherein the holding strap means comprises two part which are each at least one of vulcanized and sewn to the air cushion means and wherein the two parts are detachably connected to one another by means of a velcro-type closure means.

17. A top according to claim 16, wherein the at least one tensioning belt means is arranged between the air cushion means and the holding strap means

* * * * *